(12) United States Patent
Pearson et al.

(10) Patent No.: US 7,222,704 B2
(45) Date of Patent: May 29, 2007

(54) DAMPING OF VIBRATIONS

(75) Inventors: John B. Pearson, Cumbria (GB); Philip A. Emery, Cumbria (GB)

(73) Assignee: BAE Systems plc, London (GB)

( * ) Notice: Subject to any disclaimer, the term of this patent is extended or adjusted under 35 U.S.C. 154(b) by 109 days.

(21) Appl. No.: 10/502,589

(22) PCT Filed: Jan. 24, 2003

(86) PCT No.: PCT/GB03/00277

§ 371 (c)(1),
(2), (4) Date: Jul. 27, 2004

(87) PCT Pub. No.: WO03/065142

PCT Pub. Date: Aug. 7, 2003

(65) Prior Publication Data

US 2005/0126849 A1    Jun. 16, 2005

(30) Foreign Application Priority Data

Feb. 1, 2002    (GB)    ................................. 0202348.9

(51) Int. Cl.
*F16F 7/10*    (2006.01)
(52) U.S. Cl. ..................................... 188/378; 267/136
(58) Field of Classification Search ................ 188/378, 188/379, 380; 267/136; 248/550; 381/71, 381/94
See application file for complete search history.

(56) References Cited

U.S. PATENT DOCUMENTS

| | | | |
|---|---|---|---|
| 4,033,541 A * | 7/1977 | Malueg | ........................ 248/550 |
| 4,633,982 A | 1/1987 | Swigert | |
| 4,819,182 A * | 4/1989 | King et al. | ................... 700/280 |
| 5,291,975 A | 3/1994 | Fenn et al. | |
| 5,379,923 A * | 1/1995 | Sagastegui et al. | ....... 222/181.2 |
| 5,431,261 A | 7/1995 | Olgac | |
| 5,473,698 A | 12/1995 | Garnjost et al. | |
| 5,613,009 A | 3/1997 | Miyazaki et al. | |
| 5,620,068 A * | 4/1997 | Garnjost et al. | ............. 188/378 |
| 5,713,438 A | 2/1998 | Rossetti et al. | |
| 5,845,236 A * | 12/1998 | Jolly et al. | ................... 702/195 |
| 5,906,254 A | 5/1999 | Norris et al. | |
| 5,954,169 A | 9/1999 | Jensen | |

(Continued)

FOREIGN PATENT DOCUMENTS

DE        21 24 029 A        11/1972

(Continued)

*Primary Examiner*—James McClellan
*Assistant Examiner*—Mariano Sy
(74) *Attorney, Agent, or Firm*—Crowell & Moring LLP

(57) ABSTRACT

A selective damping apparatus includes at least one sensor for detecting, and producing signals indicative of at least the frequency and amplitude of vibrations of a first structural component (a "resonant structure") having one or more resonant frequencies. At least one vibration generator is provided for generating damping vibrations for application to the resonant structure, as well as a controller for controlling the operation of the vibration generator in delayed response to the signals produced by the at least one sensor. The at least one sensor and at least one vibration generator are adapted to cooperate with a second structural component (a "non-resonant structure") that is relatively insensitive to the resonant frequencies of the resonant structure. The nonresonant structure is connected or coupled to the resonant structure either directly or indirectly, via one or more intermediate structural components.

29 Claims, 1 Drawing Sheet

U.S. PATENT DOCUMENTS

Figure 1:
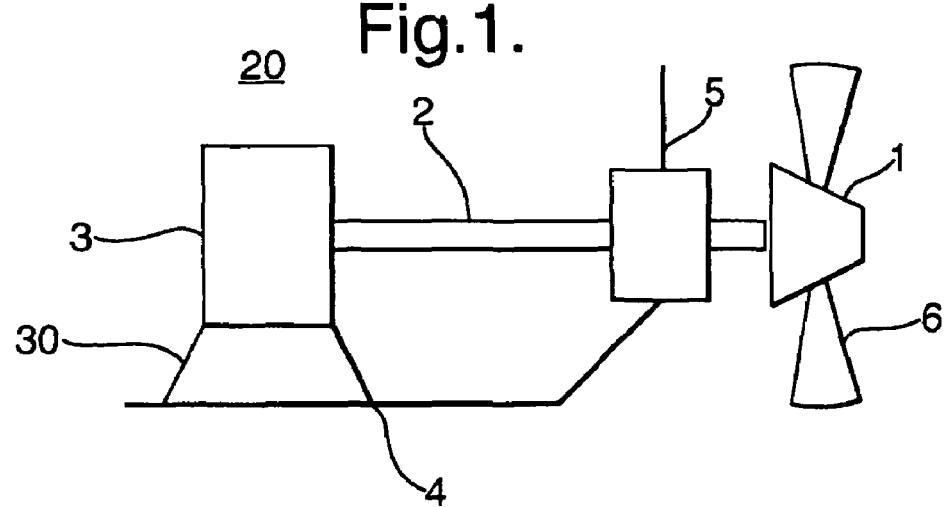

| | | | | |
|---|---|---|---|---|
| 6,009,985 A | * | 1/2000 | Ivers | 188/380 |
| 6,189,223 B1 | * | 2/2001 | Haug | 33/1 V |
| 6,193,206 B1 | * | 2/2001 | Yasuda et al. | 248/550 |
| 6,473,951 B1 | * | 11/2002 | Nakaminami et al. | 29/27 R |
| 6,518,721 B2 | * | 2/2003 | Mayama | 318/632 |
| 6,537,003 B1 | * | 3/2003 | Rostoker | 410/119 |
| 6,700,688 B2 | * | 3/2004 | Vaganov | 359/223 |
| 2003/0047395 A1 | * | 3/2003 | Patton | 188/266.7 |

FOREIGN PATENT DOCUMENTS

| | | |
|---|---|---|
| DE | 40 07 442 A | 9/1990 |
| DE | 198 12 748 C | 8/1999 |
| EP | 0 821 180 A | 1/1998 |
| EP | 0 999 379 A | 5/2000 |
| FR | 2 677 415 A | 12/1992 |
| GB | 2228778 A | 9/1990 |
| GB | 2255387 A | 11/1992 |
| GB | 2 361 757 A | 10/2001 |
| GB | 2361757 A | 10/2001 |
| JP | 630053332 A | 3/1988 |
| JP | 06 280931 A | 1/1994 |
| WO | WO 99/22361 A1 | 5/1999 |

* cited by examiner

DAMPING OF VIBRATIONS

The present invention relates to apparatus and methods of damping vibrations in structures and in equipment, systems or sub-structures connected or coupled to such structures. In particular the invention has application, although not exclusive application, to apparatus and methods for the selective damping of vibrations in vehicles and vessels such as aircraft, ships and submarines.

By the term "structures" we include assemblies of components made of solid materials joined together by physical contact, fluid media or magnetic influence to meet an overall requirement e.g. a building, bridge, aircraft or ship.

All structures have natural frequencies of vibration or resonance that can be excited by forces applied to the structure. A structure usually has a number of such natural frequencies of resonance each corresponding to a particular mode of vibration. A cylindrical structure for example will have resonant frequencies corresponding to axial, radial and circumferential modes of vibration respectively, the frequencies being determined by the materials and geometrical dimensions of the cylinder. In some structures, where the natural frequencies are excited in an operational or environmental condition in which the structure is to be used, the resulting resonance becomes a problem as it gives rise to noise, vibration or structural damage. In common practice these problems are addressed either by changing the structure:

- to change its stiffness and hence its natural frequency thus moving the resonant frequency away from the frequency of the operating or environmental condition stimulating that mode of resonance, or
- to change the damping characteristics of the structure by applying suitable materials to it to reduce the amplitude of the resonances, e.g. acoustic tiles.

A novel method of suppressing these resonant vibration problems is described in our UK patent application 2,361,757. This comprises detecting the onset of a particular mode of resonance of a structure and applying a force to it at a selected frequency to dampen that mode.

One feature of the known methods of damping resonant structures is that to be effective the sensing of modes and application of damping solutions have to be applied at, or close to the position in the structure where the resonance is causing maximum vibration amplitudes. Access to the point of maximum amplitude to apply a damping force or damping materials is not always easy or possible, whilst the application of damping materials is limited by space, weight and chemical compatibility. Moreover the application of damping to completed structures also may be limited by cost, down time and contamination of the resonant areas of the structure.

An object of the present invention is to provide apparatus and methods of controlling, from one part of a structure, the amplitude of one or more resonant modes of vibrations of another, remote, part of the structure or of a remote system connected or coupled to it.

According to the present invention in one aspect thereof there is provided selective damping apparatus comprising at least one sensor for detecting, and producing signals indicative of at least the frequency and amplitude of vibrations of a first structural component ("the resonant structure"), having one or more resonant frequencies, at least one vibration generator for generating damping vibrations for application to the resonant structure, a controller for controlling the operation of the vibration generator in delayed response to the signals produced by the at least one sensor, and wherein at least one of said at least one sensor and of said at least one vibration generator is adapted to operate in co-operation with a second structural component ("the non-resonant structure") relatively insensitive to the resonant frequencies of the resonant structure and connected or coupled to said resonant structure either directly or indirectly via one or more intermediate structural components.

Where there are two or more sensors they may be used to detect the frequency, amplitude and mode of the vibrations of the resonant structure.

The at least one sensor may be an electromechanical device, such as a piezoelectric transducer, accelerometer, strain gauge, velocity and displacement probe, force gauge, photosensitive sensor or proximity sensor depending on the frequency to be measured and physical arrangement where it is to be fitted. The sensor may be responsive to two or more frequencies of resonance of the resonant structure to produce corresponding signals for application to the controller.

The sensor may produce alternating electrical signals at one or more predetermined frequencies and/or amplitudes indicative of the detection of said one or more resonant frequencies, or it may produce an electrical control or trigger signal or pulse in response to that detection.

The vibration generator may be an electromagnetic inertial vibrator or actuator, or an electro-hydraulic inertial vibrator or actuator, or a piezoelectric inertial vibrator or actuator, or a magnetostrictive inertial vibrator or actuator, or an electro-static inertial vibrator or actuator.

The controller may be a digital electronic controller having analogue to digital input and digital to analogue output circuits for the receipt and transmission of input and output alternating analogue signals from the at least one sensor and to the at least one vibration generator respectively and a digital phase delay circuit or software for adjusting the timing and phase of the output signals with respect to the input signals. The phase delay circuit or software may be adapted to adjust the phase of the output signals such that, vibrations generated by the vibration generator cause the resonant structure to be dampened by a periodically varying force having a frequency corresponding to and substantially in phase quadrature with a resonant frequency of the resonant structure.

According to the present invention in a further aspect thereof there is provided a method of selectively damping resonances of a first structural component ("the resonant structure") of a structure comprising the steps of:

1) using at least one sensor to detect resonances of the resonant structure and to derive corresponding detection signals,
2) using the detection signals to drive at least one vibration generator to generate vibrations for application to the resonant structure.
3) controlling the frequency and phase of the vibrations so that on application to the resonant structure they are substantially in phase quadrature with a resonant frequency of the resonant structure and where for the purposes of the method, at least one of the said at least one sensors and of the at least one vibration generator is positioned to co-operate with a second structural component (the "non-resonant structure") of the structure connected or coupled to the resonant structure either directly or indirectly by means of intermediate structural components.

Figure 2:
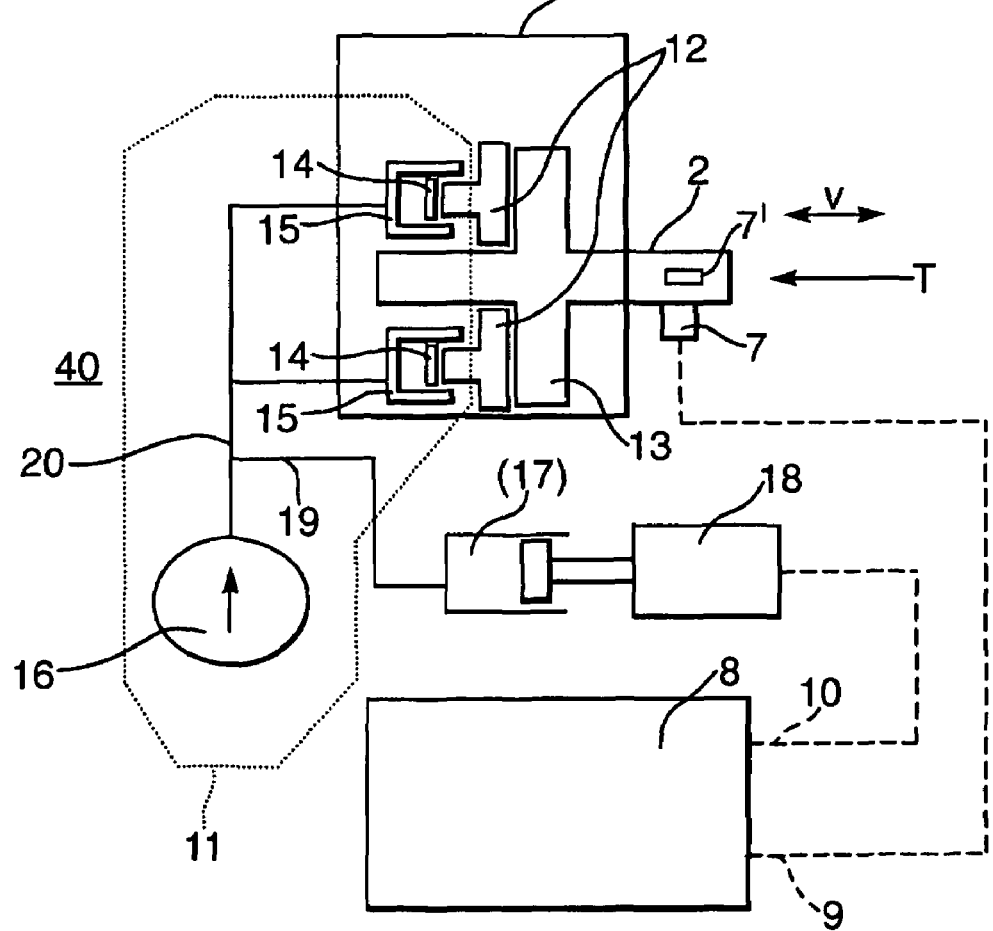

The invention will now be described by way of example only and with reference to the accompanying drawings of which;

FIG. 1 is a schematic sectional side view of a hull, propulsion mechanism and propellers of a marine vessel, and FIG. 2 is a block schematic diagram of apparatus for controlling vibrations of the propellers of the vessel shown in FIG. 1.

Referring first to FIG. 1, a marine vessel (20) comprises a hull (4) housing a propulsion unit (not shown) arranged to provide power to rotate a propeller shaft (2) supported in one or more journal bearings including a stem tube journal bearing (5) and transmitting the thrust from a propeller (1) having a number of propeller blades (6) through thrust bearings (3) in a thrust block (30) to the hull (4).

The rotation of the propeller (1) and its blades (6) generates a propulsion force which is transmitted through the propeller shaft (2) and the thrust bearings (3) and their thrust blocks (30) to the hull (4) which is thus moved through the water.

Unsteady forces on the propeller blades (6), due to variations in the water flow, vibrate the propeller (1). When the frequency of the vibration equates to a resonant mode of vibration of the blades (6), the amplitude of these vibrations increases resulting in an increase in noise, enhancement of unsteady water flow and potential failure of the blades due to plastic or fatigue fracture. The propeller shaft (2) and the hull (4) are non resonant at the resonant frequency of the propeller blades (6).

The blades' vibration creates an oscillating sound wave at their resonant frequency which travels through the non resonant propeller shaft (2) into the non resonant hull (4) via the thrust bearing (3).

Referring now to FIG. 2, in which for convenience components common to FIG. 1 have been given identical reference numerals, a selective damping apparatus comprises:

An accelerometer (7) mounted on and for rotation with the propeller shaft (2) in-board of the bearing (5) and having a telemetric link (not shown) to a stationary receiver (7') mounted adjacent the shaft (2).

The receiver (7') is connected to an analogue input (9) of a digital controller (8). The controller (8) has an analogue to digital (A to D) signal conversion circuit (not shown) at its interface with the analogue input (9). It has a digital phase-shifting delay circuit (not shown) or software connected to receive digital signals from the A to D circuit and to apply an appropriate time delay and phase shift to those signals by conventional digital signal processing techniques, and a digital to analogue conversion circuit (not shown) connected to receive the delayed and phase shifted digital signals and to provide corresponding analogue output signals at an output (10) of the controller (8).

The output (10) of the controller (8) is connected to a vibration generator (40) comprising a modified thrust metering system (11). The thrust metering system (11) is a conventional system, typically mounted within a ship's thrust block (30) for measuring the thrust force (indicated by the arrow T) on the hull generated by the propeller (1). It is a hydraulic device including thrust pads (12) in fluidic contact with a collar (13) on the shaft (2), which drive pistons (14) in cylinders (15) hydraulically connected to a pressure gauge (16) calibrated to indicate thrust.

The modification to the thrust metering system (11) to enable it to act as a vibration generator, comprises a further piston and cylinder device (17) in which the piston is moved by a solenoid (18) which in turn is connected to respond to the analogue output signals of the controller (8). The piston acts on the hydraulic fluid of the thrust metering system via a hydraulic line (19) connected to the hydraulic lines of the thrust metering system via a T-piece (20).

Other vibration generators could be used. The vibration generator may be for example a vibrator such as the hydraulically actuated vibrator described in GB2 255 387 (Dowty Aerospace Wolverhampton Ltd), or a magnetically supported and driven mass vibration cancelling device as described in GB 1 281 369 (MAS Research Ltd), or an electromagnetic inertial vibrator for example model IV 46 supplied by Gearing and Watson Ltd of Hailsham in East Sussex, or one or more actuators within the structure in a similar manner to that described in the example below.

In operation the accelerometer (7), senses the oscillating sound wave (indicated by arrows v) arriving along the propeller shaft (2) from the resonant propeller blades (6) and sends a corresponding signal via the telemetry link and the receiver (7') to input (9) of the electronic controller (8).

The electronic controller (8) identifies the propeller blade resonance from the frequency, phase and mode characteristics of the received signal which it digitises. The electronic controller (8) processes the digitised signal to generate an analogue propeller blade resonance damping signal at the output (10), phase corrected to allow for the phase shift due to sound wave transmission times from and to the propeller blades (6) and delays introduced by the electronic controller (8) itself.

The damping signal activates and deactivates the solenoid (18) correspondingly. The solenoid (18) oscillates the piston in the cylinder (17) at a frequency corresponding to the required damping signal. The piston movements vary the pressure of oil in the hydraulic thrust meter system (11) in sympathy. The oscillating pressure in the thrust meter system (11) acts via thrust meter pistons (14) and the thrust pads (12) to create a control sound wave signal in the propeller shaft (2). The control signal sound wave is transmitted axially along the shaft to the propeller blades (6). The control signal is phased to generate a damping force at the propeller blades (6) at the resonant blade frequency and mode of vibration.

The controller (8) ensures that the damping force is substantially proportional to the velocity of the blades, due to the resonance, and is applied to oppose this motion of the blades. The maximum damping force is applied when the velocity of the blades is at or near its maximum. This velocity is substantially 90° out of phase with the force exciting this resonance. It will be appreciated that relatively minor deviations from the precise phase of the maximum velocity (eg ±10°) will not greatly affect the damping effect of the damping force because the velocity of movement of the blades (6) does not vary rapidly near the maximum velocity in each cycle.

Many modifications and variations on the methods and apparatus described in the example will now suggest themselves to ones skilled in the art. For example it will be appreciated that although an application of the invention has been described with reference to the resonant vibrations of a marine vessel's propeller blades, the concept could equally be applied in other situations, for example, to the selective damping of turbulent airflow induced vibrations in aircraft wings. In the aircraft application detection of these vibrations could be effected within the aircraft fuselage by a sensor attached to a main wing spar and dampening forces could be applied to the wing remotely via an actuator acting on an inboard section of the wing spar remote from the source of vibrations at the wing tip, or via the aircraft's hydraulic undercarriage system, using the wheels as inertial shakers.

It is well know that the turbulent airflow induced vibrations of an aircraft's wing are speed dependent. In practice this limits the maximum safe speed of an aircraft to below that which would otherwise be achievable given the capability of modern jet engines. To exceed this maximum safe speed would risk wing structural vibrations leading to catastrophic failure of the aircraft structure. By damping the resonant frequencies of wing structures in a manner according to the invention it is likely that aircraft could fly at speeds closer to those theoretically possible given modern jet engine performance.

Other applications could include the remote selective damping of bridge or building resonances by sensing those resonances or applying corrective vibrations at non resonant parts of the bridge or building connected or coupled to the resonant part.

The invention claimed is:

1. In a structure having a first structural component that has at least one resonant frequency, and a second structural component that is insensitive to said at least one resonant frequency and is connected or coupled to said first structural component either directly, or indirectly via at least one intermediate structural component, a vibration damping apparatus comprising:
   at least one sensor mounted for detecting vibration of said first structural component;
   a controller coupled to said at least one sensor for identifying resonances of the first structural component from characteristics of a signal received from said at least one sensor; and
   at least one vibration generator coupled to the second structural component for generating vibrations in the second structural component to damp the vibrations of the first structural component; wherein
   said controller is coupled to said at least one vibration generator to control frequency and phase of vibrations generated by the at least one vibration generator; and
   the at least one vibration generator generates vibrations that are transmitted through the second structural component to the first structural component to dampen the vibration of the first structural component.

2. The damping apparatus as claimed in claim 1 and wherein said at least one sensor is a piezoelectric transducer.

3. The damping apparatus as claimed in claim 1 and wherein said at least one sensor is an accelerometer.

4. The damping apparatus as claimed in claim 1 and wherein said at least one sensor is a photosensitive sensor.

5. The damping apparatus as claimed in claim 1 and wherein said at least one sensor is a proximity sensor.

6. The damping apparatus as claimed in claim 1 and wherein said at least one sensor is a strain gauge.

7. The damping apparatus as claimed in claim 1 and wherein said at least one sensor is a velocity and displacement probe.

8. The damping apparatus as claimed in claim 1 and wherein said at least one sensor is a force gauge.

9. The damping apparatus as claimed in claim 1, and wherein said at least one sensor is responsive to at least two resonant frequencies of the first structural component to produce corresponding signals for application to the controller.

10. The damping apparatus as claimed in claim 1, and wherein said at least one sensor produces alternating signals at a predetermined frequency and/or amplitude in response to the detection of resonance of the first structural component.

11. The damping apparatus as claimed in claim 1, and wherein said at least one sensor produces an electrical control trigger signal in response to the detection of a resonance of the first structural component.

12. The damping apparatus as claimed in claim 1 and wherein the vibration generator is an electro-magnetic inertial vibrator or actuator.

13. The damping apparatus as claimed in claim 1 and wherein the vibration generator is an electro-hydraulic inertial vibrator or actuator.

14. The damping apparatus as claimed in claim 1 and wherein the vibration generator is a piezoelectric inertial vibrator or actuator.

15. The damping apparatus as claimed in claim 1 and wherein the vibration generator is a magnetostrictive inertial vibrator or actuator.

16. The damping apparatus as claimed in claim 1 and wherein the vibration generator is an electro-static inertial vibrator or actuator.

17. The damping apparatus as claimed in claim 1, and wherein the controller is a digital electronic controller that comprises:
   analog to digital input and digital to analog output circuits for receipt and transmission of input and output analog signals from said at least one sensor and to said at least one vibration generator respectively; and
   a digital phase delay circuit or software for adjusting timing and phase of the output signals with respect to the input signals.

18. The damping apparatus as claimed in claim 17 and wherein the phase delay circuit or software is adapted to adjust the phase of the output signals such that, via the at least one vibration generator, the first structural component is dampened by a periodically varying force having a frequency corresponding to and substantially in phase quadrature with a resonant frequency of the resonant structure.

19. The damping apparatus as claimed in claim 1, wherein said at least one sensor comprises at least two sensors for producing signals indicative of frequency, amplitude and mode of the vibrations of the first structural component.

20. The damping apparatus as claimed in claim 1, wherein:
   the damping apparatus is located within a hull of a marine vessel;
   the second structural component comprises a thrust block and propeller shaft of the vessel;
   the first structural component comprises a propeller of said vessel.

21. The damping apparatus as claimed in claim 1, wherein:
   the damping apparatus is located within an aircraft;
   the first structural component is an aircraft wing;
   the second structural component is a wing spar; and
   the damping apparatus is coupled to the wing spar and arranged for damping vibration of the aircraft wing.

22. The damping apparatus as claimed in claim 1, wherein said controller is configured to generate said vibrations that damp the vibrations of the first structural component substantially in phase quadrature to said vibrations of the first structural component.

23. The damping apparatus as claimed in claim 1, wherein said at least one sensor is mounted to the second structural component for detecting vibration of the first structural component transmitted through the second structural component.

24. In a structure having a first structural component that has at least one resonant frequency and a second structural component that is insensitive to said at least one resonant frequency and is connected or coupled to said first structural component either directly or indirectly via at least one intermediate structural component, a method for selective vibration damping, said method comprising:
   detecting vibration of said first structural component;
   identifying resonances of the first structural component from characteristics of the detected vibration; and
   generating vibrations in response to the identified resonances, which generated vibrations are controlled in frequency and phase; and
   applying said generated vibrations to said first structural component to selectively dampen the vibration of the first structural component;
   wherein said applying step comprises transmitting the generated vibrations through the second structural component to the first structural component.

25. The method as claimed in claim 24, wherein the characteristics of the detected vibration are frequency, phase, and mode.

26. The method as claimed in claim 24, wherein the generated vibrations that selectively dampen the vibration of the first structural component are substantially in phase quadrature with the vibrations of the first structural component.

27. The method as claimed in claim 24, wherein said step of detecting vibration of said first structural component comprises detecting vibration of the first structural component that is transmitted through the second structural component.

28. The method as claimed in claim 24, wherein:
   the second structural component comprises a thrust block and propeller shaft of a marine vessel; and
   the first structural component comprises a propeller of said vessel.

29. The method as claimed in claim 24, wherein:
   the first structural component is an aircraft wing; and
   the second structural component comprises a wing spar.

* * * * *